United States Patent [19]

Smith et al.

[11] 4,194,305

[45] Mar. 25, 1980

[54] ARTICULATED TRAVEL AND EDUCATIONAL MAP WITH PEEL-OFF DIVISIONS

[76] Inventors: Douglas J. Smith, 2029 Mt. Carmel Blvd., Toms River, N.J. 08753; Irving L. Kutno, 15 Carol Pl., Freehold, N.J. 07728

[21] Appl. No.: 893,007

[22] Filed: Apr. 3, 1978

[51] Int. Cl.² ............................................ G09B 29/00
[52] U.S. Cl. .................................................... 35/42
[58] Field of Search .................................. 35/42, 24 R

[56] References Cited

U.S. PATENT DOCUMENTS

| | | | |
|---|---|---|---|
| Re. 17,943 | 2/1931 | Andres | 35/24 R |
| 2,199,499 | 5/1940 | Kreitler | 35/42 X |
| 2,853,803 | 9/1958 | Exton | 35/24 R |
| 2,924,895 | 2/1960 | Bachi | 35/42 X |
| 3,849,913 | 11/1974 | Williams | 35/42 |

*Primary Examiner*—William H. Grieb
*Attorney, Agent, or Firm*—Charles F. Gunderson

[57] ABSTRACT

A two-layer map device for any given area has a first, base layer and a second, upper layer superimposed and secured by a pressure-sensitive adhesive layer. The upper layer is articulated into the primary areas of the map, so that individual states, or the like, can be peeled off, one by one, in any desired sequence, to reveal the corresponding, individual states, or the like, of a map on the under layer. The upper layer may be neutrally colored, and opaque, to cover a bright, multi-colored map on the lower layer, underneath, so that as an articulated element of the upper layer map is peeled off, a multi-colored picture of the same state or district will appear underneath. This provides a means for displaying the states or districts in sequence, to record travel, for example.

4 Claims, 4 Drawing Figures

ARTICULATED TRAVEL AND EDUCATIONAL MAP WITH PEEL-OFF DIVISIONS

BACKGROUND OF THE INVENTION

There are many uses for maps, and maps may be articulated for many purposes. They may be used for instructional games, in the form of jig-saw puzzles, for example, that have separate states cut out so that the student can learn where each state fits with relation to other states and to the overall country. Such a device is seen, for example, in the geographical game of Kreitler, U.S. Pat. No. 2,199,499, filed May 7, 1940.

Devices for providing an individual record of travel on a given map are well known. One of the most common is the use of a grease pencil or marker on a suitably-coated surface of a map. However, these markers require a steady hand, and are, at best, not particularly neat. Also, they do not emphasize the states, as such, nor draw attention to their historical or economical value to the country, or their significance in a given travel itinerary.

Other types of devices, such as stickers, or decalcomanias, are usually available at various points along a journey, to be acquired and displayed on car windows, for example, to indicate the various states or cities that are visited. These are colorful, but suggest no logical interconnection nor geographical context and are usually too space-consuming to cover a very extensive trip.

Still another display device for travelers is the "Display Map Device for Indicating the Extent of Travels of a Motorist" of Bradford Williams Sr., U.S. Pat. No. 3,849,913, issued Nov. 26, 1974. This uses a first, transparent sheet with a pressure-sensitive adhesive backing that is stuck onto the window of a car with an outline map of a given area. A second, opaque sheet with a pressure-sensitive adhesive backing has an articulated map, identical to the outline map of the transparent sheet. This articulated sheet is applied to the transparent sheet with the maps superimposed.

The display is altered by removing a given, articulated element of the second, opaque sheet, and substituting a corresponding element from a third, articulated sheet with still another pressure-sensitive backing. The second opaque sheet may be neutrally colored, and the elements of the third sheet may be distinctively colored to draw attention to the particular state or portion of the map.

However, this device requires a transparent material, that must limit the possible materials and strength of the base layer, as well as posing special problems in printing the outline. This also requires an extra, pressure-sensitive layer beneath the transparent layer, with an extra sheet of protective material for the exposed adhesive prior to use, as well as the pressure-sensitive, adhesive-backed elements of the second opaque layer.

Most inconvenient is the necessity of having the additional element of the third sheet to be added. These must be separately provided, or obtained, and must be separately stored at some non-contiguous place. Last, but not least, the individual pieces of the second, opaque layer for a state like Rhode Island would be very difficult to remove from the first transparent sheet, and it would be almost beyond average skill to substitute the new element of the third sheet in a neat register.

It is therefore an object of this invention to provide a "Go & Show" (TM) display map to permanently record the areas visited in an orderly, state-by-state sequence; that is relatively easy to use; that has a minimum number of layers; and that can be moved from place to place for study or display, or can be interchanged with other similar displays.

SUMMARY OF THE INVENTION

An articulated map for showing the course of travels through a given country has a base layer with a multi-colored map of the given country divided into states or travel areas. An opaque, line-drawn overlay that is cut into the identical divisions of states or travel areas, with a pressure-sensitive adhesive backing, is superimposed on top of the base layer map. The articulated divisions of the opaque, line-drawn overlay or upper layer may be peeled off individually in the course of the travel or the like to reveal the bright multicolored states or topographical divisions of a given area as they are seen.

DESCRIPTION OF THE PREFERRED EMBODIMENT

Figure 1:
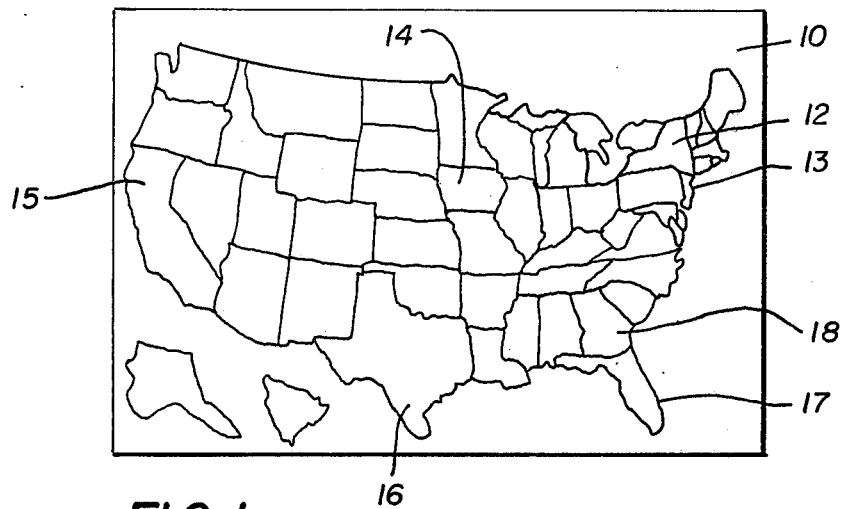
FIG. 1 shows the map with its opaque overlay.

Referring now more particularly to FIG. 1, a map is seen, in outline, on a neutrally-colored overlay 10 of this device. This map represents the United States, with states such as 12 through 18 clearly seen and easily recognizable.

Figure 2:
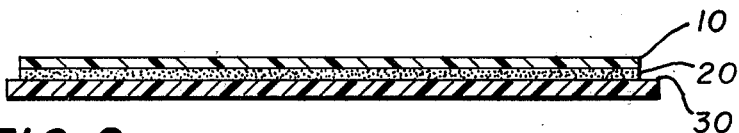
FIG. 2 shows a cross section of the layers of the map.

FIG. 2 shows a cross section of a map, such as is shown in FIG. 1, with the upper layer or overlay 10, secured by means of an adhesive layer 20 to a base layer 30. The thicknesses of the layers are exaggerated here to show them more clearly and to suggest possible proportions.

Figure 3:
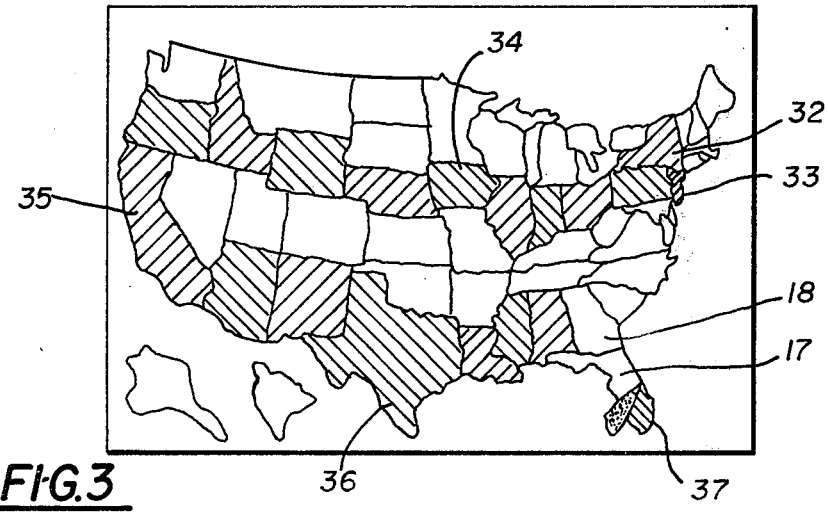
FIG. 3 shows the map with a sequence of elements of the overlay removed.

FIG. 3 shows the device of FIG. 1 being used, with the states or map sections 12 through 16, as well as certain intermediate sections removed to reveal the corresponding states or map sections 32 through 36 of the more colorful map of the base layer. In FIG. 3, the section 17 of the upper layer, is seen being pulled off to reveal the state 37 of the base layer.

Figure 4:
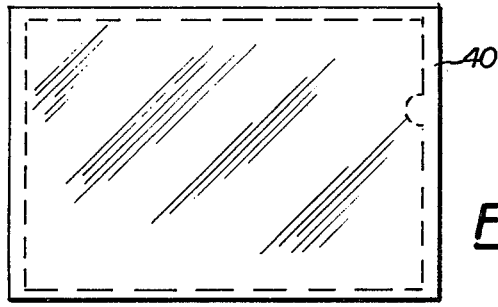
FIG. 4 shows a typical transparent envelope for display.

FIG. 4 shows a transparent envelope 40 that may have at least one side coated with a pressure-sensitive adhesive not shown, with which the envelope may be attached to any desired surface; in this case, presumeably the inside of a car window. This envelope is at a reduced scale, but must, of course, be of a sufficient size and a shape to contain the map device, which will be fitted into the envelope to be seen from the desired side.

In operation, a protective layer, not shown, must presumeably be used to cover the pressure-sensitive layer on one of the sides of the transparent envelope, and must be removed from the one side of the transparent envelope, so that the envelope can be secured to a car window or the like. This would normally be a side window so that the map will not interfere with the visibility of the driver, for safety reasons. The map, initially, as seen in FIG. 1, is then inserted in the transparent envelope with the side showing the map facing in the desired direction.

Whenever the traveller reaches, or passes through, a given state or division of the map, the map device can be withdrawn from the envelope, and the corresponding state or division of the articulated top layer map, which is opaque, can be peeled off the base layer to reveal the underlying, bright multicolored portion of the map. The map device is then returned to the envelope for display until the next state or division is reached.

The articulated state or division of the top layer may be discarded, or may be stuck onto any other suitable surface, or onto another map, not shown, which may be made available for this purpose to provide a parallel record of the sequence of states covered in a real or imaginary journey.

The upper layer 10 must be of a suitable material, presumeably paper, that can accommodate a pressure-sensitive backing, and withstand the removal of any individual piece as a unit, neatly and without damage. Since the map must be articulated, the upper layer must be of a material that can be cleanly cut or stamped into the desired pattern.

The upper layer may be of a neutral color and opaque, as noted, with clearly-defined articulations, or it may be made more colorful for any esthetic reason. The only obvious need is that it be in sharp and colorful contrast to the map sections printed on the lower base layer, so that removal of one of the elements of the upper layer is clearly noticeable by the contrast. It is not that the upper-layer map need be colorless, it is only that it should provide enough contrast to accentuate the sequence of states involved.

Pressure-sensitive adhesives are suggested here as an obvious means for holding the upper layer onto the base layer until one or more of the elements of the upper layer are to be pulled off. However, other forms of adhesives are conceivable, and if they can serve this function, they would be applicable here.

The lower layer 30 may be of any material that can accommodate, or be coated to accommodate, the pressure-sensitive adhesive bond of the top layer. The lower layer may be relatively thick so that the map device can be handled or moved about for display purposes. It may be of heavy paper or cardboard, or of plastic of any suitable thickness and strength. In fact, both the upper and lower layers may be of plastic, or plastic coated, where moisture may be a factor.

Since this map device is intended as a graphic, geographical display, presumable in conjunction with travel, the means for display are significant. In this case, a transparent plastic envelope 40 is suggested, with means for holding it against a car window, so that the map is clearly visible from the outside. The map device may be withdrawn at will for changes, or display elsewhere, or for storage. The inner side of the envelope may actually be opaque, if only the outside of the car is to see the map display, and there is need for a place to print additional information. However, with both sides transparent, the display may be reversed at will. Obviously, the display envelope may be used for other purposes.

While only states are indicated in this typical embodiment, it will be obvious that topographical features may be included, and that these features, or any other distinctive, area-related features, such as crops, or industries can be made the objects of separate divisions.

It is to be understood that I do not desire to be limited to the exact details of construction shown and described since obvious modifications will occur to a person skilled in the art.

What is claimed is:

1. A geographical display device comprising a first map imprinted on the upper side of a first, base layer;

a second map, identical in size and shape to said first map, imprinted on the upper side of a second, upper layer, said second layer having a pressure-sensitive backing on its lower side;

said second map being superimposed on said first map and held in place, along with said second layer, by said pressure-sensitive backing, against said first layer;

said second map being articulated along certain boundaries of the land of said second map, so that portions of said second layer and said second map, defined by said certain boundaries, can be pulled off said first layer to reveal the corresponding portions of said first map; and means for holding said geographical display device in a desired position.

2. A geographical display device as in claim 1 wherein said first map is brightly colored and said second map is monochrome with only said boundaries, and corresponding names, being marked.

3. A geographical display device as in claim 1 wherein said first map is of a first color, and said second map is of another, easily-visible, contrasting color.

4. A geographical display device as in claim 1 wherein said first and second maps are of the United States and said boundaries define the various states of the United States.

* * * * *